(12) United States Patent
Stubler et al.

(10) Patent No.: US 11,014,580 B2
(45) Date of Patent: May 25, 2021

(54) UNDERGROUND DISTRIBUTION SYSTEM FOR THE DISTRIBUTION OF GOODS IN AN URBAN ENVIRONMENT

(71) Applicant: Vinci Construction, Rueil-Malmaison (FR)

(72) Inventors: Jerome Stubler, Paris (FR); Jean-Serge Boissavit, Paris (FR); Maxime Trocme, Paris (FR)

(73) Assignee: VINCI CONSTRUCTION, Rueil-Malmaison (FR)

( * ) Notice: Subject to any disclaimer, the term of this patent is extended or adjusted under 35 U.S.C. 154(b) by 609 days.

(21) Appl. No.: 15/571,653

(22) PCT Filed: Sep. 15, 2017

(86) PCT No.: PCT/EP2017/073367
§ 371 (c)(1),
(2) Date: Nov. 3, 2017

(87) PCT Pub. No.: WO2018/050869
PCT Pub. Date: Mar. 22, 2018

(65) Prior Publication Data
US 2019/0126945 A1    May 2, 2019

(30) Foreign Application Priority Data

Sep. 16, 2016 (FR) ...................................... 1658686
Sep. 15, 2017 (FR) ...................................... 1758580

(51) Int. Cl.
*B61B 13/10* (2006.01)
*B61B 12/00* (2006.01)
(Continued)

(52) U.S. Cl.
CPC ................ *B61B 13/10* (2013.01); *B61B 9/00* (2013.01); *B61B 12/002* (2013.01);
(Continued)

(58) Field of Classification Search
CPC ......... B61B 13/10; B61B 9/00; B61B 12/002; B61B 13/122; B60L 2200/26; G06Q 50/28; B65G 37/02
See application file for complete search history.

(56) References Cited

U.S. PATENT DOCUMENTS 2,638,636 A * 5/1953 Pool ......................... E04H 3/04
                                                        52/33
3,217,912 A * 11/1965 McKeon ................... B66F 9/18
                                                       414/403
(Continued)

FOREIGN PATENT DOCUMENTS

CA        2189768 C    11/2006
CA        2682011 A1    4/2010
(Continued)

OTHER PUBLICATIONS

International Search Report (ISR) for PCT/EP2019/055227 dated May 28, 2019 (14 pages including English translation).
(Continued)

*Primary Examiner* — Jason C Smith
(74) *Attorney, Agent, or Firm* — Shumaker, Loop & Kendrick, LLP

(57) ABSTRACT

Underground distribution system for the distribution of goods in an urban environment including at least one micro-tunnel forming at least one loop, extending under the foundations of preexisting surface buildings and/or infrastructures, in which goods, the transportation of which is automated, circulate, and a plurality of exchange stations exchanging with the surface, each including a shaft allowing goods to be lowered down to the micro-tunnel and raised back up after they have been transported within the micro-tunnel.

72 Claims, 4 Drawing Sheets

Figure 1:
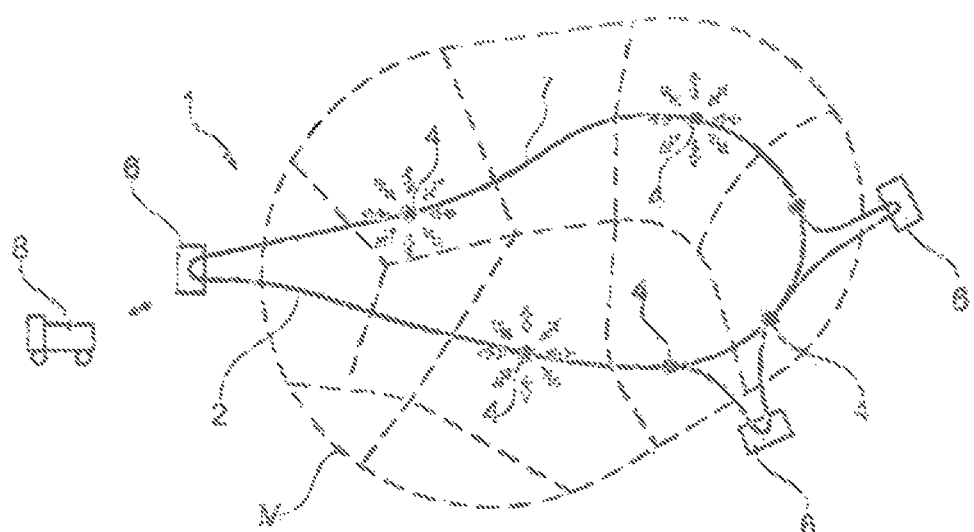

(51) Int. Cl.
  *B61B 9/00* (2006.01)
  *B61B 13/12* (2006.01)
  *G06Q 50/28* (2012.01)

(52) U.S. Cl.
  CPC ......... *B61B 13/122* (2013.01); *B60L 2200/26* (2013.01); *G06Q 50/28* (2013.01)

(56) References Cited

U.S. PATENT DOCUMENTS

| | | | | |
|---|---|---|---|---|
| 3,507,224 A * | 4/1970 | Sweger | ................ | B60P 7/132 410/83 |
| 4,512,258 A * | 4/1985 | Matsukata | ............. | B61B 13/10 104/138.1 |
| 4,754,709 A * | 7/1988 | Gramse | ................. | B60P 7/13 105/355 |
| 5,017,066 A * | 5/1991 | Tylisz | ................... | B60P 7/13 105/355 |
| 5,063,857 A * | 11/1991 | Kissel, Jr. | ............... | B61B 13/00 104/88.04 |
| 5,158,155 A * | 10/1992 | Domain | ................. | E04H 3/02 186/53 |
| 5,282,424 A * | 2/1994 | O'Neill | ................. | B61B 13/10 104/138.1 |
| 5,586,686 A * | 12/1996 | Bustos | ................... | E04H 3/02 221/211 |
| 5,720,363 A * | 2/1998 | Kipp | ..................... | B61B 13/10 186/55 |
| 6,240,851 B1 * | 6/2001 | Oudakker | ............ | B61B 15/00 104/127 |
| 6,810,817 B1 * | 11/2004 | James | .................. | E01B 25/22 104/88.04 |
| 9,505,559 B1 | 11/2016 | Cai | | |
| 2001/0020429 A1 * | 9/2001 | Serrano | ................ | B61B 13/00 104/91 |
| 2001/0026549 A1 * | 10/2001 | Hameleers | ........... | G06Q 10/047 370/389 |
| 2002/0062759 A1 * | 5/2002 | Chaabi | ................ | B61B 13/10 104/138.1 |
| 2003/0075366 A1 * | 4/2003 | Sabatie | ................ | F16L 55/28 180/7.1 |
| 2010/0082151 A1 * | 4/2010 | Young | .................. | G06Q 10/08 700/226 |
| 2011/0112936 A1 * | 5/2011 | Hendrickson | .......... | G06Q 99/00 705/27.1 |
| 2014/0009496 A1 * | 1/2014 | Chapman | ............... | G06Q 10/10 345/636 |
| 2014/0330456 A1 * | 11/2014 | Lopez Morales | .... | G05D 1/0022 701/3 |
| 2015/0367986 A1 * | 12/2015 | Etchegary | ............... | B63B 25/00 108/53.5 |
| 2016/0019497 A1 * | 1/2016 | Carvajal | ............... | H04W 4/029 701/519 |
| 2019/0126945 A1 * | 5/2019 | Stubler | ................. | B61B 12/002 |

FOREIGN PATENT DOCUMENTS

| | | |
|---|---|---|
| CA | 2672928 A1 | 12/2010 |
| CN | 1978262 A | 6/2007 |
| CN | 101117118 A | 2/2008 |
| CN | 102013161 A | 4/2011 |
| CN | 201804380 U | 4/2011 |
| CN | 102280025 A | 12/2011 |
| CN | 102602631 A | 7/2012 |
| CN | 102602632 A | 7/2012 |
| CN | 104213484 A | 12/2014 |
| CN | 104680345 A | 6/2015 |
| CN | 204586872 U | 8/2015 |
| CN | 105046474 A | 11/2015 |
| CN | 105069598 A | 11/2015 |
| CN | 105139164 A | 12/2015 |
| DE | 2100842 A1 | 7/1972 |
| DE | 19711462 A1 | 9/1998 |
| DE | 102004034041 A1 | 2/2006 |
| DE | 102012018006 A1 | 3/2013 |
| EP | 0069043 A1 | 1/1983 |
| EP | 0208624 A1 | 1/1987 |
| EP | 0360710 A1 | 3/1990 |
| EP | 0369363 A1 | 5/1990 |
| EP | 0678433 A1 | 10/1995 |
| EP | 2318253 A1 | 5/2011 |
| FR | 2847873 A1 | 6/2004 |
| GB | 2311092 A | 9/1997 |
| JP | H1134729 A | 2/1999 |
| KR | 100558829 B1 | 3/2006 |
| RU | 2009103447 A | 8/2010 |
| WO | 03/049985 A1 | 6/2003 |
| WO | 2015118186 A2 | 8/2015 |
| WO | 2016050194 A1 | 4/2016 |
| WO | 2016060961 A1 | 4/2016 |
| WO | 2018050869 A1 | 3/2018 |
| WO | 2019170559 A1 | 9/2019 |

OTHER PUBLICATIONS

CN Office Action ("CN OA") for CN App. No. 2017800574281 dated May 8, 2020 (25 pages total including English translation).
"Chicago Tunnel Company", https://en.wikipedia.org/wiki/Chicago_Tunnel_Company accessed May 30, 2019 (17 pgs.).
E. Lopato, "I Took a Ride Through Elon Musk's New Tunnel in California", The Boring Company, p. 1-11, (2017).
D. Gattuso, "Automated Rail Wagon for new freight transport opportunities", IEEE, p. 57-62, (2017).
S. Hussain, "Towards a Robust Rescue Network: Wireless Communication is the Choice", IEEE, p. 182-187, (2017).
Ben-Jaap Pielage, "Underground Freight Transportation. A new development for automated freight transporation systems in the Netherlands.", IEEE, Intelligent Transporation Systems Conference Proceedings, Oakland, CA, USA, p. 762-767, Aug. 25-29, 2001.
International Search Report dated Jan. 29, 2018 in International Patent Application No. PCT/EP3017/073367 with English Translation (7 pages).

* cited by examiner

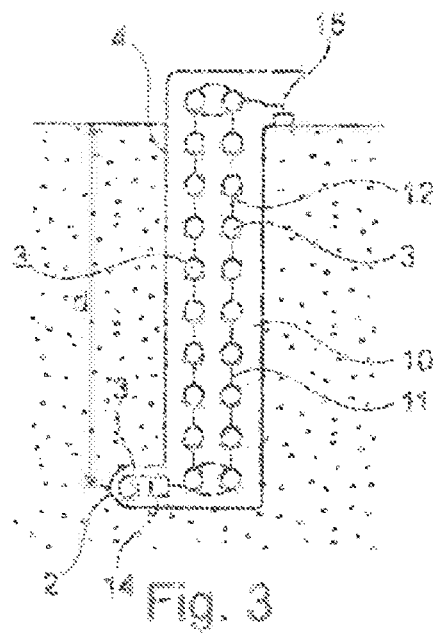
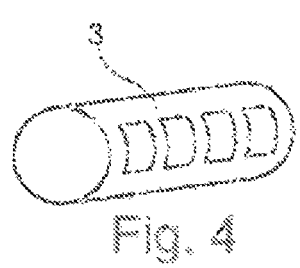
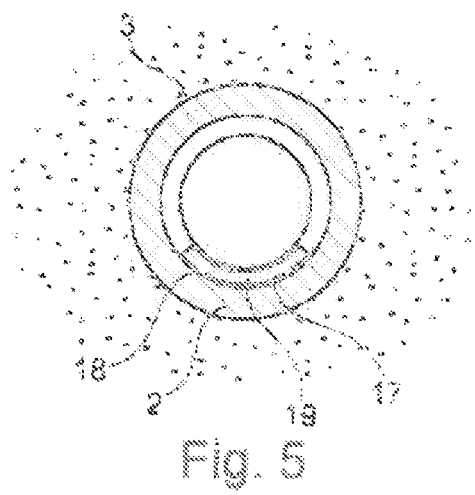

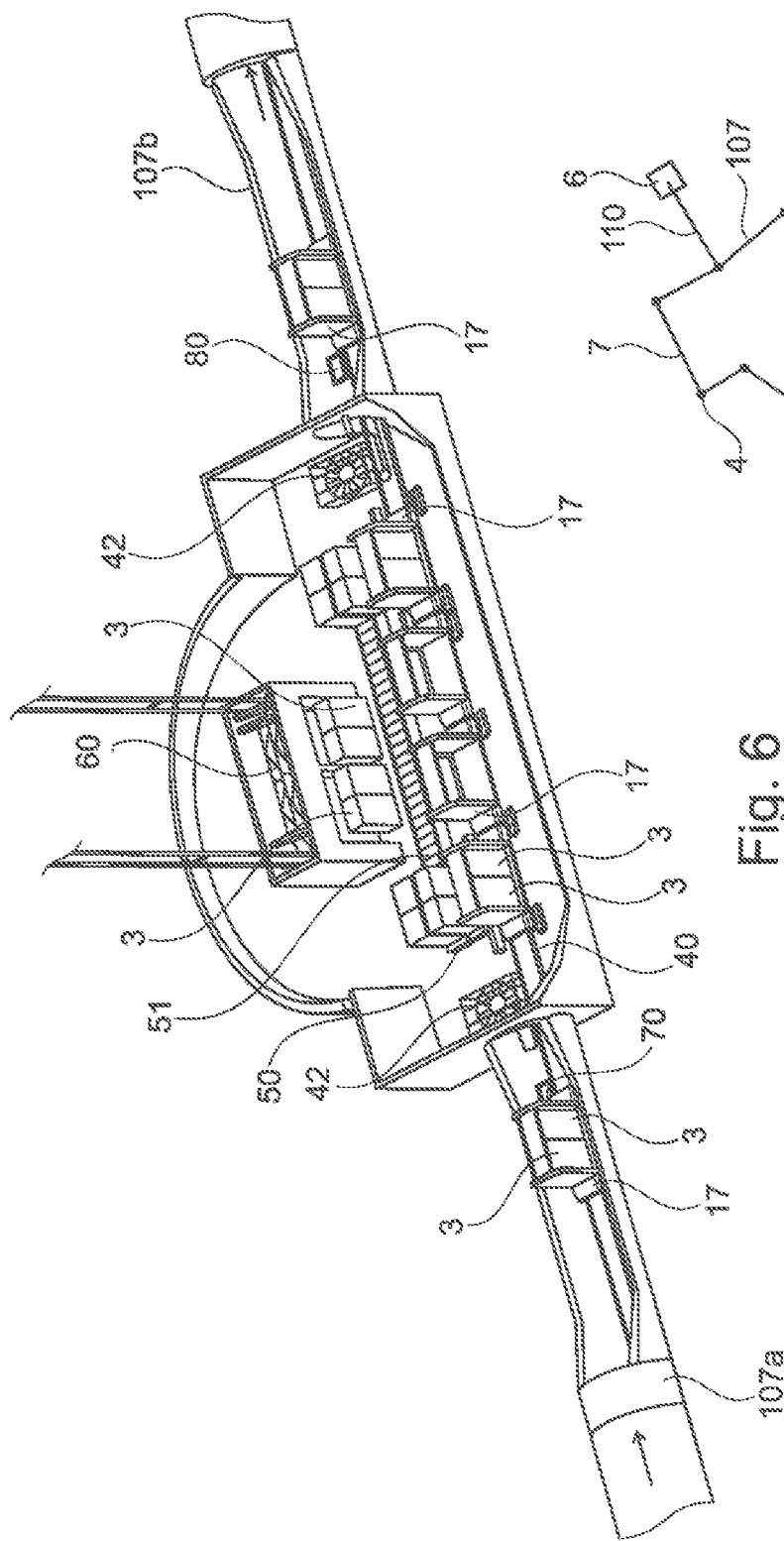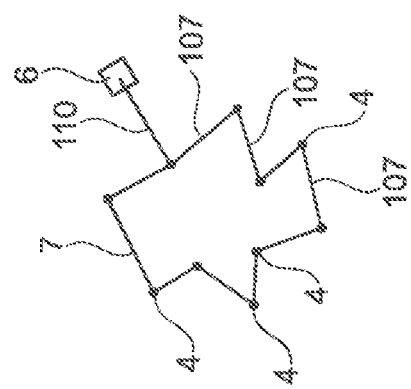

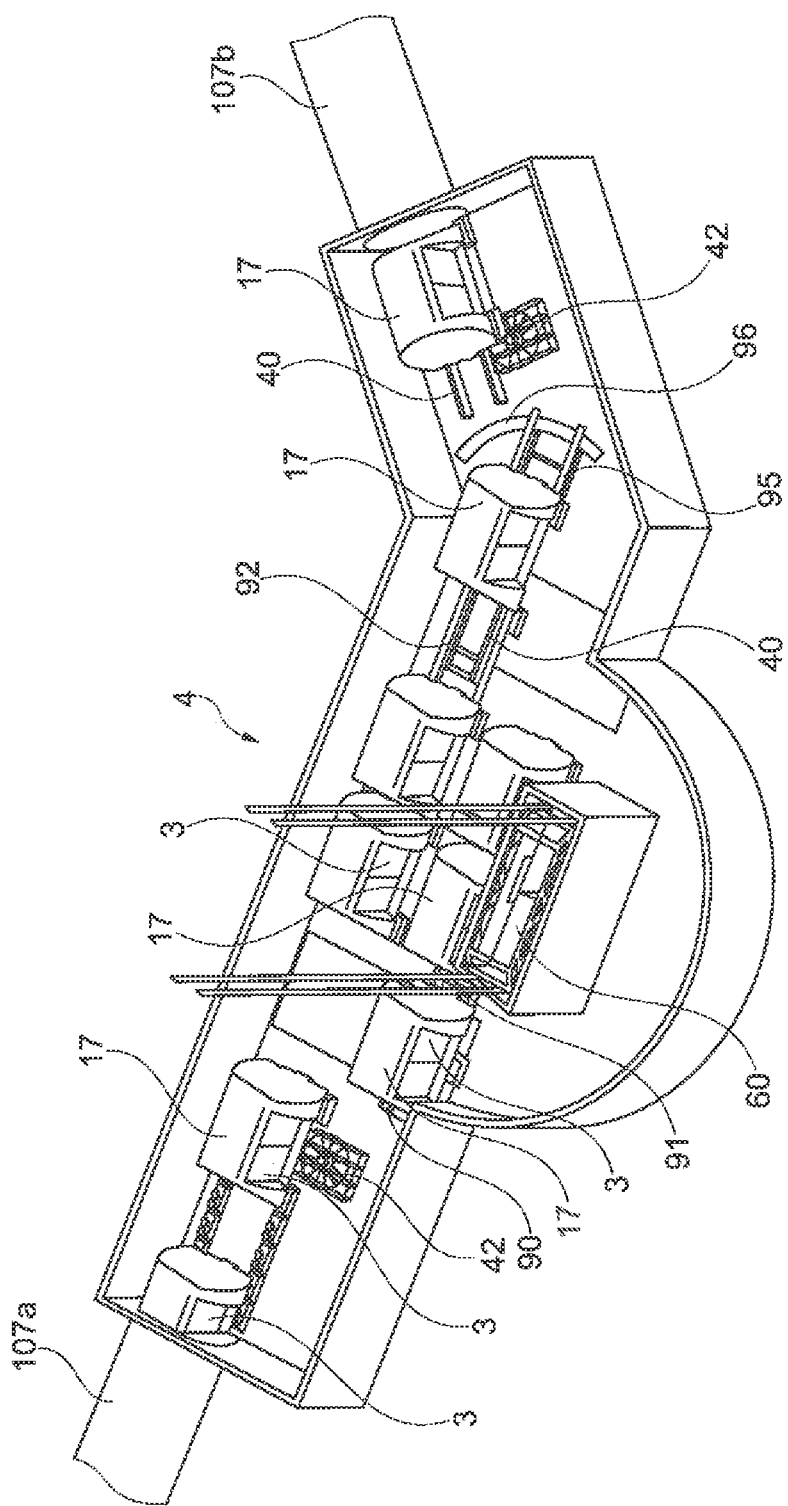

UNDERGROUND DISTRIBUTION SYSTEM FOR THE DISTRIBUTION OF GOODS IN AN URBAN ENVIRONMENT

The present invention relates to the distribution of goods in an urban environment.

Carrying goods right into the heart of a city is currently performed chiefly using vehicles such as trucks, and this poses multiple problems.

First of all, because the vast majority of these vehicles are combustion engine vehicles, their circulation contributes to the atmospheric pollution of the cities. Next, the goods distribution time is lengthened because of congestion on the main traffic routes.

There is therefore a need to facilitate and speed-up the distribution of goods in an urban environment.

A system for the automated conveying of goods has been proposed in application CN 105046474, comprising a pipeline in a loop with a certain number of branches off it. The pipeline is fitted with rails which serve to electrically power the vehicles circulating in it.

Patent application US 2002/0062759 discloses an automated transport system of the point-to-point type comprising multiple autonomous containers moving on rails in galleries running for example under dwellings at a small depth or on the surface. Each container may be moved by an electric motor. Such a system is not designed to transport a high volume of goods and is not suitable for serving an entire conglomeration, with a daily goods tonnage typically of several hundred if not thousand tons. In addition, the installation of the pathways along which the containers circulate needs to be performed in concert with the planning of the dwellings through which the pathway passes, because the pathways are, at least some of them, arranged at the same depth as the basements of these dwellings.

The invention seeks to further improve the goods distribution systems in order to provide an answer to the problem of distributing goods to the heart of cities.

One subject of the invention is thus, according to a first aspect of the invention, an underground distribution system for the distribution of goods in an urban environment, comprising:

- at least one micro-tunnel forming at least one loop extending under the foundations of preexisting surface buildings and/or infrastructures, underground or otherwise, in which goods, particularly packaged in loading units, notably containers or goods on pallets, the transportation of which is automated, circulate,
- a plurality of exchange stations exchanging with the surface, each comprising a shaft allowing goods, notably loading units, to be lowered down to the micro-tunnel and raised back up after they have been transported within the micro-tunnel.

The invention provides an answer to the problem of the logistics of the penultimate kilometer in a dense urban environment by allowing the transport loop to be buried to a relatively great depth. Such a depth avoids, or even minimizes, interference with existing buildings. The invention also makes it possible to reduce urban pollution.

The choice of a micro-tunnel from which to create the transport loop allows the use of proven techniques, and allows the underground system to be created at a cost that is compatible with the economic interests involved.

In addition, the transport system comprises at least one ordering station for ordering the goods to be injected into the loop and to be distributed by means of the exchange stations situated on the loop. This ordering station is preferably connected by at least one two-directional transport line to the loop, notably to at least one exchange station of the loop.

The ordering station allows the goods rounds to be prepared notably so that the goods grouped together within one and the same loading unit corresponds to a delivery arriving at one and the same exchange station, at which the loading unit will be taken out of the loop formed by the micro-tunnel and raised back up to the surface, to be taken in hand by a fleet of electric vehicles, for example, which will carry these goods to their final destination.

The presence of one or more ordering stations on the periphery of the system and of the city served by the loop makes it possible to manage a high throughput of goods and to inject a high quantity of goods into the loop more easily than could be done by exchange stations situated on the loop itself and which communicate with shafts liable to be relatively narrow.

In addition, the line may slope and the ordering station may be buried, in so far as its underground installations are concerned, at a lesser depth than the depth to which the micro-tunnel sections that form the loop are buried.

The transport system may comprise leaving shuttles loaded with loading units the ordering station and returning thereto empty after having unloaded their contents at an exchange station situated on the loop and chosen for its proximity to the end-destination of the goods.

The transport system may thus comprise at least one line, referred to as a "feeder" line, that supplies the loop with goods. This line may or may not be unidirectional. It may concentrate the logistic facilities for packaging the goods and loading the shuttles when the goods circulate on shuttles. This line may handle most, if not all, of the loading of the shuttles, the exchange stations within the loop preferably having the main role of distributing the goods rather than of loading them.

The exchange stations may be configured to transport a plurality of loading units, notably of containers, simultaneously to the surface or the micro-tunnel. In particular, the exchange stations may comprise means of transporting the loading units, notably the containers, in a loop between the micro-tunnel and the surface.

An exchange station may be connected to just one upstream loop section and one downstream loop section, outside the station. A bend may occur within the station, without the need to reverse the direction in which the goods progress, from the upstream section to the downstream section.

At least one exchange station may be designed to store loading units, notably containers, notably while they are awaiting a surface pickup of the goods they will transport, storage being, for example, within the corresponding shaft or alternatively at the surface. Storing at least some of the loading units, notably containers, in the shafts of the exchange stations makes it possible to minimize the surface footprint of the system.

For preference, the system comprises shuttles for transporting the loading units, notably containers, circulating in the micro-tunnel, for example self-propelled shuttles and preferably cable-hauled shuttles. The use of cables makes it possible to reduce the cost of the shuttles while at the same time having available a transport system that is quick and reliable.

As an alternative or in addition, the loading units are containers that are self-propelled so that they can move autonomously in the micro-tunnel.

In particular, the shuttles or containers may advantageously be fitted with batteries so that they can be powered autonomously. That may make it possible to avoid the need to create electrical power supply rails within the micro-tunnel, and that greatly reduces the cost of the system.

The goods may be packaged in various ways.

They may be contained within loading units each formed of a pallet on which the goods are placed, these goods being held in position using a film, notably a stretch film.

They may also be housed in a crate or any other type of container of the shipping container type, which may or may not be made of metal, may or may not be compartmentalized, and may be of any shape suited to circulation in the micro-tunnel, being arranged if necessary on a transport shuttle.

Notably in the case of goods loading units comprising pallets, the height of each loading unit may be comprised between 1.5 and 2.3 m, preferably being of the order of 2 m. The width may be of the order of 1 m, the pallets for example being of the type standard in Europe.

In alternative forms of embodiment, the goods circulate within the micro-tunnel in shuttles hauled in the micro-tunnel using at least one cable. This cable may run between two ends of a section of the loop formed by the micro-tunnel, these ends preferably being situated at exchange stations exchanging with the surface. The shuttles may thus, during their journey within the loop formed by the micro-tunnel, pass from a first section of loop in which they are moved by a first cable, to a second section of loop in which they are moved by a second cable different than the first, the transfer from the first section to the second taking place within an exchange station.

When propelled autonomously by an electric motor, each shuttle or container may be electrically recharged in various ways. Advantageously, the shuttles or containers are recharged during their journey within the micro-tunnel, notably by discrete or linear recharging terminals.

In the absence of guide rails in particular, the shuttles or containers may have wheels rotating about axes of rotation that are not mutually parallel, preferably wheels resting directly on the wall of the micro-tunnel. The shuttles or containers may have an automatic centering system for moving the axes of the wheels, notably allowing the shuttle or the container to be centered in the lower part of the micro-tunnel. US 2003/0075366 discloses a transport vehicle in a micro-tunnel designed to run directly along the wall of the micro-tunnel, which may be adapted to the transporting of containers.

In an alternative form, the micro-tunnel is equipped with rails on which the containers or shuttles travel. The use of rails is preferable when the containers or shuttles are hauled by a cable.

The cable laid in a section may be over 1 km long, for example at least 4 km, better 6 km, for example 8 km or more long, thus making it possible to achieve a section of 4 km or more given that the cable runs in one direction to haul the shuttles and in the other direction when unladen. The cable may be mounted on pulleys and tensioning rollers, in a similar way to the systems used in ski lifts or chair lifts.

The cable may run between the rails, parallel to these, allowing a gain in terms of compactness, and allowing the cable guide structure, where relevant, to be mounted on a support that is common to the rails.

The shuttles may have, in cross section, an overall shape that at least partially mirrors that of the micro-tunnel, and notably may comprise a cradle to accept at least one container or other loading unit, of arched shape concentric with the wall of the micro-tunnel. That may make it possible to optimize the use of the system by reducing the amount of micro-tunnel cross section not used for transporting goods.

In addition, that makes it possible, for the same volume of goods transported, to minimize the external cross section of the micro-tunnel and thus make it easier to produce. Given the length of the micro-tunnel, which may measure several kilometers or tens of kilometers, any reduction, even modest, in the external cross section has a significant knock-on effect on the cost of the works.

The shuttles may have a space to accept one or more loading units such as palletized goods, preferably two or four loading units placed side by side.

Each shuttle may have a roof which extends over the loading units, and front and rear walls on which the roof rests.

The containers may have a cross section of circular overall shape. Other shapes of cross section are possible, notably circular with flat, or polygonal, notably square.

For preference, the micro-tunnel has a cross section of circular overall shape.

The micro-tunnel may be produced in various ways and, for example, comprise sections assembled one after the other, notably of lengths comprised between 2.5 and 3.5 m, and with wall thicknesses of between 150 and 500 mm, these sections preferably being designed to withstand a boring thrust of at least 500 metric tons.

As an alternative, the micro-tunnel comprises assembled arch segments.

For preference, the sections or arch segments are at least partially made of reinforced concrete, notably with a double layer of reinforcements.

The micro-tunnel may have a lining, notably made of metal.

In one exemplary embodiment a largest interior dimension of the micro-tunnel, in cross section, notably the interior diameter thereof, is comprised between 1.5 m and 4 m, notably between 1.5 and 2.5 m or between 2.5 m and 4 m, for example between 1.5 and 2.2 m or between 3 and 4 m.

The micro-tunnel is advantageously buried to a depth greater than or equal to 5 m. The use of a micro-tunnel in the invention makes it possible to envision a greater depth of burying, for example greater than 20 m or 30 m, or even greater than or equal to 35 m, 40 m or 50 m or more, so as to pass under the existing foundations and infrastructures and not interfere with these. The feeder may be buried to a depth that varies and is not that of the loop.

It may be advantageous for at least one of the containers to have independent compartments that may be opened and closed independently of one another.

That may notably prove attractive from a logistical standpoint as it allows access to just part of the container in order to collect the corresponding goods, while the goods present in the other compartments remain inaccessible. That may be beneficial when the consignees of the goods are varied and the goods are picked up at different times by different participants.

Each container may be designed to accept one or more pallets, as appropriate.

For preference, the containers or shuttles circulate unidirectionally along the loop. Each section between two exchange stations of the loop is thus traveled by goods circulating in the same direction as the direction of this section. Thus, the shuttles or containers do not pass one another within the micro-tunnel, thereby making it possible to tailor the cross section of the micro-tunnel closely to the cross section of a container or of a shuttle and to reduce the amount of micro-tunnel cross section not of use in the transportation of goods.

However, as indicated above, the invention does not exclude the goods being brought into the loop using at least one feeder where the goods, notably carried onboard shuttles or in containers, will circulate two-directionally. This line may be a two-track line within a tunnel or having two parallel tunnels.

The system may comprise, at the exchange stations, a system for unloading and/or loading the shuttles or containers. In particular, the system may comprise surface transport vehicles suited to transporting the containers or other loading units, or the goods carried therein. In particular, the delivery of the goods in the final kilometer may be performed by a fleet of electric vehicles.

The transport vehicles may have a cylindrical cradle to accept the containers when the containers are cylindrical in shape.

For preference, the shaft of at least one of the exchange stations is sufficiently dimensioned as to act as a working shaft when boring the micro-tunnel using a micro-tunneling technique. That means that the excavation work done during the boring of the micro-tunnel can then be used thereafter to create one or more exchange stations and these can be used for storing goods or equipment.

Where appropriate, the underground goods distribution system according to the invention is equipped with a system for regulating the transport of the shuttles or containers without overall flow management intelligence, each container and/or transport shuttle being fitted with one or more sensors that allow a previous container and/or shuttle and the exchange stations to be located, allowing the containers to regulate their speed according to the weight of traffic, to stop at the exchange stations, and potentially to push a broken-down vehicle in order to bring it out of the micro-tunnel loop.

The micro-tunnel may be under a reduced oxygen pressure. That makes it possible to limit the risk of fire. In particular, the oxygen level may be 15%, better still 20% or 50% or even more, lower than the nominal level in the open air.

Each exchange station may comprise a device, for example using rollers, to progressively slow the shuttles as they arrive at the exchange station, and a launch system to allow them to latch on to the moving cable without too much of a jolt.

The exchange station may comprise a mechanism for picking up the goods carried by a shuttle while at the same time allowing the shuttle to then continue on its journey in the transport loop.

The unloading of a shuttle may be performed by switching the shuttle to a different track or by extracting its contents without a change in track.

The exchange station for example comprises a mechanism for transporting a portion of track bearing a shuttle, between a first position for receiving a new shuttle coming from the transport loop, in which position the portion of track runs in the continuation of the track extending in the micro-tunnel, and a second position of switching to a loading/unloading track, which allows one or more loading units transported by the shuttle to be unloaded to a lift such as a goods lift or allows the shuttle to receive one or more new loading units to transport.

As an alternative, only the shuttle is moved from the arrival track to the loading/unloading track without the rails on which its wheels are engaged accompanying this movement.

As a further alternative, only the goods are unloaded from the shuttle without the shuttle being switched to a specific loading/unloading track.

The shuttles may be driven by any means when they are not coupled to the hauling cables, for example by rollers or by any other auxiliary drive mechanism.

The loading units may be transported by conveying rollers and/or by a transfer system.

The loop may comprise bends situated at the exchange stations. That may make it possible to keep to straight sections within the loop, making the micro-tunnel easier to construct and the shuttles easier to drive. In order to cause the shuttles to go round bends, they may be kept on rails and a turntable may be provided, that comprises a mobile track rail that allows them to be oriented toward the departure track. It is also possible not to keep them on rails, driving them using an auxiliary drive system in which they are carried for example by rollers or by a roller conveyor or transported by any other conveying system that allows the shuttles to be made to turn tight bends.

In one exemplary embodiment, when the exchange station connects two sections of micro-tunnel forming the loop which are oriented in different directions making a nonzero angle between them, the exchange station comprises a turntable bearing a mobile portion of track on which at least one shuttle may position itself.

This turntable is able to adopt a position in which the mobile track aligns with a track for bringing in shuttles, and a position in which said mobile track aligns with the track of the next section of micro-tunnel that is to be navigated.

The loop formed by the micro-tunnel may comprise a succession of sections, the length of which is, for example, greater than 1 km, connected by exchange stations which provide the connection between the sections with different orientations. The sections may be straight if desired, as mentioned above, making the micro-tunnel easier to bore and to construct.

A further subject of the invention, according to another of the aspects thereof, is a method for distributing goods in an urban environment using a system according to the invention as defined hereinabove, comprising the steps consisting in:

a) bringing goods to an exchange station by a surface means of transport, these goods being contained in at least one loading unit, notably a container, or being on pallets, b) lowering this loading unit, notably the container, down to the micro-tunnel, c) circulating the loading unit, notably the container, in the micro-tunnel as far as another exchange station exchanging with the surface, d) raising the loading unit, notably the container, back up to the surface.

The method may also comprise the following additional steps:

e) picking up the loading unit, notably the container, or all or some of the goods it contains, f) delivering the loading unit, notably the container, either complete or in sub-sets of elements preestablished at the time of packing of the loading unit, notably the container, to a consignee.

For preference, most of the goods transported within the loop come from at least one exchange station designed to ensure high logistic flows, and connected to the loop by a dedicated line, namely the feeder mentioned hereinabove.

The method may count on transporting over 1000 t/d, or even over 10000 t/d.

The loading unit, notably the container, may remain contained within the exchange station without being raised back up to the surface, notably being stored within the shaft of the exchange station, awaiting a request to pick up the loading unit, notably the container, or goods contained therein.

The method may comprise the step of transporting the loading units on shuttles hauled by cables. The cable may run at a speed greater than or equal to 5 m/s, better still, greater than or equal to 7 m/s, for example of the order of 8 m/s or more. Each shuttle may be accelerated as it leaves an exchange station to reach the speed of the hauling cable and progressively slowed as it arrives at the next exchange station. Each shuttle may comprise a releasable clamp which engages with the cable.

The weight of each loading unit is preferably comprised between 100 and 500 kg or even more, for example 1000 kg or above.

A further subject of the invention, according to another of the aspects of the invention, is a container for transporting goods in a system as defined hereinabove, having a cylindrical overall shape of circular cross section with an outside diameter of between 1 and 2.5 m and means of quick coupling to a transport shuttle circulating in the micro-tunnel, notably a shuttle having a cradle of arched shape to accept the container. For preference, such a container is axially compartmentalized, it being possible for the compartments to be opened and closed independently.

A further subject of the invention is a shuttle for transporting at least one loading unit, preferably goods that are palletized, containerized or otherwise, comprising a mechanism for coupling to a hauling cable, wheels, and a space to accept the loading unit or units, preferably four loading units arranged in two rows of two. The shuttle may be opened on the sides, and have a roof connecting the front and rear walls.

Yet another subject of the invention is an assembly made up of a container and of a shuttle for transporting the container within a micro-tunnel, the shuttle comprising a cradle for accepting the container on which cradle this container may be received removably, the container having the overall shape of a cylinder of revolution and the cradle an arched shape which is concentric about the longitudinal axis of the container.

In particular, the shuttle may comprise wheels with non-parallel axes of rotation, designed to run directly along the wall of the micro-tunnel. The shuttle may comprise a centering system for centering it in the lower part of the micro-tunnel.

Yet another subject of the invention is an exchange station comprising a buried part connecting two sections of micro-tunnel, comprising means of unloading shuttles circulating in the micro-tunnel.

The exchange station comprises for example a first track able to move between a position for receiving a shuttle coming from one of the sections, and a position of conveying the shuttle on a loading/unloading track, in which the shuttle runs past a system for conveying loading units to and from a lift rising to the surface, and a second track able to move between a position for receiving the shuttle circulating on the loading/unloading track and a position of conveyings toward the other section.

The exchange station may be designed to cause the goods circulating in the loop to take a bend.

The exchange station may comprise, in one example, a mobile track mounted on a turntable; when the two sections of micro-tunnel arranged upstream and downstream of the station make an angle between them. As an alternative, the exchange station comprises rail-free shuttle conveying means, for example on casters or rollers, allowing the desired bend to be negotiated. The use of shuttle conveying means that have no rails or mobile tracks makes the shuttles easier to move and avoids the use of switchgear. That allows the use of shuttles that are not self-propelled. That also allows a saving in terms of compactness, and therefore makes it possible to limit the volume of soil to be excavated in order to construct the exchange station. The use of a turntable means that two sections of micro-tunnel subtending a large angle between them can be connected very easily and the sections oriented in such a way as to optimize their length. That also makes it possible to use straight sections, compatible with the use of a cable hauling system for hauling the shuttles, and allowing the shuttles to move at a very high speed.

Figure 2:
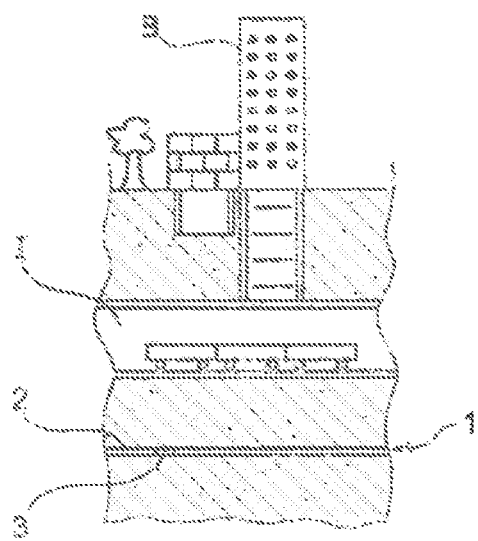

The invention may be better understood from reading the detailed description which follows, of one nonlimiting exemplary embodiment thereof, and from studying the attached drawing, in which:

FIG. 1 very schematically shows a view from above of the path followed by the transport loop in one exemplary embodiment of the invention, FIG. 2 is a vertical section through the system according to the invention, in the heart of the city, FIG. 3 schematically and partially depicts one example of an exchange station exchanging with the surface, FIG. 4 schematically and partially depicts an example of a container, FIG. 5 schematically and partially depicts, in cross section, an example of an assembly of shuttle and container, traveling in the micro-tunnel, FIG. 6 depicts schematically and into perspective one example of an exchange station connecting two sections of the transport loop, FIG. 7 depicts an alternative form of exchange station, and FIG. 8 depicts, schematically, an alternative form of transport loop.

The system 1 according to the invention, depicted in the figures, comprises a micro-tunnel 2 which forms a transport loop 7 extending at least partially under a dense urban environment M constituting the heart of a city and comprising, as can be seen in FIG. 2 surface buildings B and buried infrastructures I under which the micro-tunnel 2 extends. The latter is designed to allow the automated transport of goods present in loading units such as containers 3.

The system 1 comprises exchange stations 4 allowing goods to be lowered from and raised back up to the surface, these exchange stations 4 being arranged along the transport loop 7 so as to allow goods to be routed to various zones Z of the city for local distribution.

The system 1 also comprises exchange stations 6 at which the ordering of the goods may take place, which ordering activities are scheduled to be performed away from the urban environment M, on the outskirts of the city, so as to make the goods easier to bring in and carry away by surface transport means 8 such as trucks. These exchange stations 6 are also referred to as ordering stations.

Each exchange station 4 or 6 comprises a shaft 10 within which there extends a system 11 for transporting the loading units, notably containers 3, between the surface and the micro-tunnel 2.

This system 11 comprises for example a mechanism that allows the loading units 3 to circulate in a loop, these units being, for example, coupled or otherwise fixed to gondolas 12 while they are being transported in the shaft 10.

An automated system 14 may be provided at the bottom of the shaft to extract the loading units 3 from the micro-tunnel 2 and load onto the transport system 11, coming and placing the loading units 3 in the gondolas 12. Likewise, a robotic system 15 is provided at the surface in order to extract the loading units 3 or the goods contained therein and allow them to be picked up at the surface.

The loading units 3 may be self-propelled containers or, as an alternative, may be carried by transport shuttles 17 which circulate unidirectionally in the micro-tunnel 2.

For preference, as illustrated in FIG. 5, these transport shuttles 17 have a cross-sectional shape which generally mirrors that of the micro-tunnel 2 so as to optimize occupancy of the cross section of the micro-tunnel. Thus, the shuttles 17 may, as illustrated, have a cradle 19 which accepts at least one container 3. The latter preferably then, as illustrated, has a circular cross section concentric with the micro-tunnel 2.

The shuttle 17 preferably comprises a mechanism that allows it to center itself in the bottom part of the micro-tunnel, for example by altering the angle between the axes of rotation of the wheels 18 of the shuttle which rest against the wall of the micro-tunnel.

The system 1 may be used as follows, in one exemplary embodiment of the invention.

The containers 3 loaded with the goods are carried by surface transport means 8 to at least one of the exchange stations 6 situated on the outskirts of or outside the city. The containers are then lowered to the micro-tunnel 2. Each container 3 is then transported as far as the exchange station at which at least some of the goods transported need to be delivered, then raised back up to the surface. After these goods have been picked up, the container 3 is lowered back down as far as the micro-tunnel 2 to continue on its round. If necessary, the container 3 is stored at the exchange station awaiting, for example, a surface pickup request.

When one or more containers are stored in the exchange station, the raising or lowering of a container from the micro-tunnel 2 to and from the surface may be accompanied by a movement of all the other containers.

Of course, the invention is not restricted to this example.

In particular, the shape of the containers may be modified, and notably they may be given any shape suited to being transported by surface vehicles and within the micro-tunnel. The goods may also be transported without being containerized.

The means used to allow the loading units to be moved between the micro-tunnel and the surface may be modified and it is notably possible to envisage one or more lifts that raise or lower one or more loading unit(s).

The storage of the loading units, notably of the containers, may be performed elsewhere than in the shafts of the exchange stations, for example in one or more depots on the surface or buried to a shallow depth, present for example at the exchange stations 6 in the outskirts.

Other examples of exchange stations 4 and of the transport system according to the invention will now be described with reference to FIGS. 6 to 8.

The exchange station 4 in the example of FIG. 6 connects a first section 107a of the transport loop 7 to a second section 107b which is aligned with the first in this example.

The goods in this example are packaged on pallets within loading units 3.

The loading units 3 are transported by shuttles 17 which run on rails 40 within the micro-tunnel sections of the transport loop.

Cable haulage mechanisms 42 are provided for moving the shuttles 17 along the various sections 107 of the transport loop.

The shuttles 17 comprise a disengageable clamp device which engages with the hauling cable, in a similar way to the mechanisms present on disengageable ski lifts and chair lifts.

Devices 70 and 80 are provided to respectively perform progressive slowing on arrival at the station 4 and progressive acceleration on leaving the station, using an auxiliary drive system.

In the example of FIG. 6, the slowing device 70 comprises for example rollers which apply increasing friction to the shuttles 17 as they near the station 4 so as to slow them down as far as the zone at which cable haulage ceases. Each shuttle is then taken over by a conveyor, for example by rollers, which drive it past a system 50 that loads/unloads the loading units 3.

This system 50 may comprise a roller conveyor 51 for transporting the loading units 3 past the entrance to a lift 60 which allows the loading units 3 to be carried to the surface. The lift may be a two-compartment goods lift, one compartment for example being used to collect the loading units 3 unloaded by the shuttles 17 and the other to receive loading units 3 sent down from the surface and load them onto the shuttles 17, as illustrated.

Next, the shuttles 17 leave the station 4 being progressively accelerated by the device 80 which allows the shuttles 17 to reach the speed of the haulage cable so as to be driven thereby.

In the alternative form of FIG. 7, the micro-tunnel sections 107a and 107b make an angle between them and the exchange station 4 comprises a loading/unloading system. The shuttles that arrive at the exchange station 4 are successively positioned on a section of track 90 that is able to move sideways between a first position in which it is a continuation of the rails 40 of the upstream section 7a, to receive the shuttle 17, and second a position as illustrated in FIG. 7, for unloading the shuttle 17, in which this mobile section of track 90 aligns with a loading/unloading track 91. This track 91 moves past an opening for transferring the loading units 3 to a lift 60 so that these can be raised/lowered.

Once the loading units 3 have been loaded or unloaded onto or from the shuttles 17 that file past the lift 60 using any suitable transfer mechanism, the shuttles are positioned on a second mobile section of track 92, which can be moved sideways between a position allowing the loading of the shuttles 17 traveling along the track 91 and a position in which this mobile section is aligned with a third section of track 95 situated on a turntable 96. This turntable 96 allows the shuttle 17 previously positioned on the second mobile section of track 92 to be picked up and its rails can be aligned with the track 40 of the downstream second section 107b so that the shuttle 17 can depart onto this section.

Such a system for loading/unloading the shuttles 17 allows rapid and automated handling of the loading units 3, compatible with cable haulage 42, and the presence of the mobile platform table 96 makes the loop easier to build by allowing the use of loop sections 107 that are straight or substantially straight.

In some alternative forms that have not been illustrated, the shuttles 17 can be made to pivot without a turntable by making them run on castors or rollers in place of rails between the sections 107a and 107b and by using guide means which, if appropriate, allow them to negotiate a relatively tight bend.

It is also possible, in alternative forms that have not been illustrated, to bring the shuttles to an unloading/loading track without simultaneously transporting them with the rails on which they are engaged, by moving them using a conveyor.

It is even possible in another alternative form to unload or load the shuttles while they are on a track lying as a continuation of the tracks running in the sections 107 of the micro-tunnel.

For preference, the micro-tunnel and the exchange stations are placed under a reduced atmosphere of oxygen or under an inert atmosphere so as to reduce the risks of fire. That makes it possible to limit the cost of the infrastructure by rendering unnecessary certain safety devices which would otherwise be required for compliance with the standards.

In the example of FIGS. 6 and 7, the loading units 3 are goods on pallets.

FIG. 8 depicts an alternative form of embodiment of the transport loop 7, comprising straight or substantially straight micro-tunnel sections 107 connected by the exchange stations 4 which are, for example, as illustrated in FIGS. 6 and 7.

The main flow of goods injected into the loop 7 may run on a line 110 referred to as a feeder, connected to a peripheral ordering station 6 in the outskirts, which constitutes a rear base, and where the goods that are to be transported are packaged and ordered according to their destination. Thus, goods intended to pass through one and the same exchange station 4 of the loop 7 in order to reach their final destination are packaged within the one same loading unit, and this packaging may advantageously take place at the ordering station. The order in which the shuttles are loaded at the ordering station 6 may also be performed according to the destination of the goods loaded onto each of these shuttles. The station 6 may thus manage a significant proportion of the flow of goods injected into the loop, and make it possible to limit the flow of goods loaded onto the shuttles from the exchange stations 4 situated on the loop.

The line 110 may be two-directional and produced in the form of a two-track tunnel or of two micro-tunnels which may or may not be parallel.

Of course, the invention is not restricted to one particular type of loading unit 3 and any type of container may be used.

At the surface, the exchange stations may comprise a storage zone for storing the loading units 3 while they are waiting to be sent to a loading or unloading bay where they may be installed on electric vehicles for example.

The invention claimed is:

1. An underground distribution system for the distribution of goods in an urban environment, the goods being contained in loading units, the system comprising:
   at least one micro-tunnel forming at least one loop, extending under foundations of preexisting surface buildings and/or infrastructures at a depth of at least 5 m, in which goods circulate unidirectionally by automated transportation,
   a plurality of exchange stations exchanging with a surface, each comprising a shaft allowing loading units to be lowered down to the micro-tunnel and raised back up after they have been transported within the micro-tunnel, at least one exchange station being configured to store loading units within the corresponding shaft.

2. The system as claimed in claim 1, wherein the system is configured for a surface pick up of the stored loading units or goods contained therein.

3. The system as claimed in claim 1, wherein the exchange stations are situated on the loop and the system further comprising at least one ordering station for organizing the goods to be introduced into the loop and to be distributed by means of the exchange stations situated on the loop, in which the at least one ordering station is connected by at least one two-directional transport line to the loop.

4. The system as claimed in claim 3, wherein the transport line comprises a tunnel in which loading units or shuttles circulate two-directionally, or two micro-tunnels in which the loading units or shuttles circulate in opposite directions.

5. The system as claimed in claim 1, wherein the goods contained in loading units comprise goods in containers and/or goods on pallets.

6. The system as claimed in claim 5, wherein at least one of the containers comprises independent compartments that can be opened and closed independently of one another.

7. The system as claimed in claim 5, the containers being self-propelled so that they can move autonomously in the micro-tunnel.

8. The system as claimed in claim 7, wherein the containers comprise wheels that rotate about axes of rotation that are not mutually parallel.

9. The system as claimed in claim 7, further comprising a system for regulating the transport of the containers without overall flow management intelligence, each container being fitted with at least one sensor that allows a container located in front thereof and the exchange stations to be located, the regulating system allowing the containers to regulate their speed according to the weight of traffic and to stop at the exchange stations.

10. The system as claimed in claim 5, wherein the containers have a cross section of circular overall shape.

11. The system as claimed in claim 1, wherein the exchange stations are configured to transport a plurality of loading units simultaneously to the surface or to the micro-tunnel.

12. The system as claimed in claim 1, wherein the exchange stations comprise a means for transporting the loading units in a loop between the micro-tunnel and the surface.

13. The system as claimed in claim 1, further comprising shuttles configured for transporting the loading units that circulate in the micro-tunnel.

14. The system as claimed in claim 13, further comprises a system for unloading and/or loading the shuttles at the exchange stations.

15. The system as claimed in claim 13, further comprising a system for regulating the transport of the shuttles without overall flow management intelligence, each loading unit and/or its transport shuttle being fitted with at least one sensor that allows a loading unit and/or shuttle located in front thereof and the exchange stations to be located, the regulating system allowing the shuttles to regulate their speed according to the weight of traffic, to stop at the exchange stations, and potentially to push a broken-down vehicle in order to bring the broken vehicle out of the micro-tunnel loop.

16. The system as claimed in claim 15, wherein each shuttle comprise on-board intelligence.

17. The system as claimed in claim 13, wherein the shuttles are hauled by at least one cable within the micro-tunnel.

18. The system as claimed in claim 17, wherein the cable running between two ends of a section of the loop formed by the micro-tunnel, these ends being situated at exchange stations exchanging with the surface.

19. The system as claimed in claim 17, wherein the shuttles are configured to pass, during their journey within the loop formed by the micro-tunnel, from a first section of loop in which they are moved by a first cable to a second section of loop where they are moved by a second cable different than the first, the transfer from the first section to the second taking place within an exchange station.

20. The system as claimed in claim 13, wherein at least one exchange station comprises a mechanism for transporting a portion of track bearing a shuttle between a position for receiving a new shuttle coming from the transport loop, in which position the portion of track runs in the continuation of the track extending in the micro-tunnel, and a position of switching to a loading/unloading track, which allows one or more loading units transported by the shuttle to be unloaded to a lift or allows the shuttle to receive one or more new loading units to transport.

21. The system as claimed in claim 13, wherein each exchange station is configured to unload a shuttle arriving at the exchange station of at least some of its content which has reached its destination, and to raise this content back up to the surface.

22. The system as claimed in claim 13, wherein at least one exchange station comprises a turntable bearing a mobile portion of track on which at least one shuttle may position itself, the turntable being able to adopt a position in which the mobile track aligns with a track for bringing in shuttles, and a position in which said mobile track aligns with the track of the next section of micro-tunnel that is to be navigated.

23. The system as claimed in claim 13, wherein the shuttles are battery powered so that they can be powered autonomously.

24. The system as claimed in claim 23, wherein the shuttles are configured for recharging by discrete or linear recharging terminals.

25. The system as claimed in claim 13, wherein the shuttles comprise wheels that rotate about axes of rotation that are not mutually parallel.

26. The system as claimed in claim 13, wherein the shuttles comprise, in cross section, an overall shape that at least partially mirrors that of the micro-tunnel.

27. The system as claimed in claim 1, the micro-tunnel having a cross section of circular overall shape.

28. The system as claimed in claim 1, wherein the micro-tunnel comprises sections assembled one after the other, of a length of between 2.5 and 3.5 m, and with a wall thickness of between 150 and 500 mm, and configured to withstand a boring thrust of at least 500 metric tons.

29. The system as claimed in claim 28, wherein the sections at least partially comprise reinforced concrete.

30. The system as claimed in claim 1, wherein the micro-tunnel comprises assembled arch segments.

31. The system as claimed in claim 1, wherein a largest interior dimension of the micro-tunnel, in cross section, comprises between 1.5 m and 4 m.

32. The system as claimed claim 1, wherein the micro-tunnel is buried to a depth greater than or equal to 20 m.

33. The system as claimed in claim 1, wherein the shaft of at least one of the exchange stations is sufficiently dimensioned to act as a working shaft when boring the micro-tunnel using a micro-tunneling technique.

34. The system as claimed in claim 1, wherein at least one exchange station connecting two sections of the micro-tunnel forming the loop which are oriented in different directions that make a non-zero angle between them.

35. The system as claimed in claim 34, wherein the sections are being straight.

36. The system as claimed in claim 1, further comprising surface transport vehicles for transporting to their final destination the loading units or goods contained therein.

37. The system as claimed in claim 36, further comprising an automated system at the surface for unloading the loading units or goods contained therein from the exchange stations and allow them to be picked up at the surface by the surface transport vehicles.

38. A method for distributing goods in an urban environment using a system as defined in claim 1, comprising:
 a) bringing goods to an exchange station by a surface means of transport,
 b) lowering the goods down to the micro-tunnel,
 c) circulating the goods in the micro-tunnel as far as another exchange station exchanging with the surface,
 d) raising the goods back up to the surface.

39. The method as claimed in claim 38, further comprising:
 picking up the goods at the surface,
 delivering the goods to a consignee.

40. The method as claimed in claim 38, wherein the goods being contained in loading units, the loading unit remaining contained at the exchange station without being raised back up to the surface, while it awaits a request to pick up the loading unit or goods contained therein.

41. The method as claimed in claim 38, wherein the goods circulate unidirectionally in the micro-tunnel.

42. The method as claimed in claim 38, wherein the goods are introduced into the transport loop predominantly via a two-directional transport line connected to the transport loop.

43. The method as claimed in claim 38, wherein, before being introduced into the transport loop, the goods being, at an ordering station, grouped together on one and the same pallet and/or within one and the same container or compartment of a container corresponding to a delivery arriving at one and the same exchange station, at which the grouped goods will be raised back up to the surface.

44. An underground distribution system for the distribution of goods in an urban environment, the goods being contained in loading units, the system comprising:
 at least one micro tunnel forming at least one loop, extending under foundations of preexisting surface buildings and/or infrastructures at a depth of at least 5 m, in which goods circulate unidirectionally by automated transportation,
 a plurality of exchange stations exchanging with a surface, each comprising a shaft allowing loading units to be lowered down to the micro tunnel and raised back up after they have been transported within the micro tunnel,
 shuttles for transporting the loading units, circulating in the micro tunnel,
 at least one cable within the micro tunnel for hauling the shuttles.

45. The system as claimed in claim 44, wherein the exchange stations are situated on the loop and the system further comprising at least one ordering station for organizing the goods to be introduced into the loop and distributed by means of the exchange stations situated on the loop, in which the at least one ordering station is connected by at least one two-directional transport line to the loop.

46. The system as claimed in claim 44, further comprising surface transport vehicles for transporting the loading units or goods contained therein to a final destination.

47. The system as claimed in claim 44, wherein at least one exchange station is configured to store loading units within the corresponding shaft.

48. The system as claimed in claim 44, further comprising a system for regulating the transport of the shuttles or loading units without overall flow management intelligence, each loading unit and/or its transport shuttle being fitted with at least one sensor that allows a loading unit and/or shuttle located in front thereof and the exchange stations to be located, the regulating system allowing the shuttles to regulate their speed according to the weight of traffic and/or to stop at the exchange stations.

49. The system as claimed in claim 44, wherein a largest interior dimension of the micro tunnel, in cross section, is between 1.5 m and 4 m.

50. An underground distribution system for the distribution of goods in an urban environment, the goods being contained in loading units, the system comprising:
 at least one micro tunnel forming at least one loop, extending under foundations of preexisting surface buildings and/or infrastructures at a depth of at least 5 m, in which goods circulate unidirectionally by automated transportation,
 a plurality of exchange stations exchanging with a surface, each comprising a shaft allowing loading units to be lowered down to the micro tunnel and raised back up after they have been transported within the micro tunnel,
 shuttles for transporting the loading units, circulating in the micro tunnel,
 a system for regulating the transport of the shuttles or loading units without overall flow management intelligence, each loading unit and/or its transport shuttle being fitted with at least one sensor that allows a loading unit and/or shuttle located in front thereof and the exchange stations to be located, the regulating system allowing the shuttles to regulate their speed according to the weight of traffic and/or to stop at the exchange stations.

51. The system as claimed in claim 50, wherein the exchange stations are situated on the loop and the system further comprising at least one ordering station for organizing the goods to be introduced into the loop and distributed by means of the exchange stations situated on the loop, in which the ordering station is connected by at least one two-directional transport line to the loop.

52. The system as claimed in claim 50, further comprising surface transport vehicles for transporting the loading units or goods contained therein to a final destination.

53. The system as claimed in claim 50, wherein the regulating system allows the shuttles to push a broken down vehicle in order to bring the broken vehicle out of the micro tunnel loop.

54. The system as claimed in claim 50, wherein each shuttle is endowed with on-board intelligence.

55. The system as claimed in claim 50, wherein at least one exchange station is configured to store loading units within the corresponding shaft.

56. The system as claimed in claim 50, further comprising at least one cable within the micro tunnel for hauling the shuttles.

57. The system as claimed in claim 50, wherein a largest interior dimension of the micro tunnel, in cross section, is between 1.5 m and 4 m.

58. An underground distribution system for the distribution of goods in an urban environment, the goods being contained in loading units, the system comprising:
 at least one micro tunnel forming at least one loop, extending under foundations of preexisting surface buildings and/or infrastructures at a depth of at least 5 m, in which goods circulate unidirectionally by automated transportation, a largest interior dimension of the micro tunnel, in cross section being comprised between 1.5 m and 4 m,
 a plurality of exchange stations exchanging with a surface, each comprising a shaft allowing loading units to be lowered down to the micro tunnel and raised back up after they have been transported within the micro tunnel.

59. The system as claimed in claim 58, wherein the exchange stations is situated on the loop and the system further comprising at least one ordering station for organizing the goods to be injected into the loop and to be distributed by means of the exchange stations situated on the loop, in which the ordering station is connected by at least one two-directional transport line to the loop.

60. The system as claimed in claim 58, further comprising surface transport vehicles for transporting to their final destination the loading units or goods contained therein.

61. The system as claimed in claim 58, wherein at least one exchange station is configured to store loading units within the corresponding shaft.

62. The system as claimed in claim 58, further comprising shuttles for transporting the loading units, circulating in the micro tunnel.

63. The system as claimed in claim 62, further comprising at least one cable within the micro tunnel for hauling the shuttles.

64. The system as claimed in claim 62, further comprising a system for regulating the transport of the shuttles or loading units without overall flow management intelligence, each loading unit and/or its transport shuttle being fitted with at least one sensor that allows a loading unit and/or shuttle located in front thereof and the exchange stations to be located, the regulating system allowing the shuttles to regulate their speed according to the weight of traffic and/or to stop at the exchange stations.

65. An underground distribution system for the distribution of goods in an urban environment, the goods being contained in loading units, the system comprising:
 at least one micro tunnel forming at least one loop, extending under foundations of preexisting surface buildings and/or infrastructures at a depth of at least 5 m, in which goods circulate unidirectionally by automated transportation,
 a plurality of exchange stations exchanging with a surface, each comprising a shaft allowing loading units to be lowered down to the micro tunnel and raised back up after they have been transported within the micro tunnel,
 surface transport vehicles for transporting to their final destination the loading units or goods contained therein.

66. The system as claimed in claim 65, wherein the exchange stations are situated on the loop and the system further comprising at least one ordering station for organizing the goods to be injected into the loop and to be distributed by means of the exchange stations situated on the loop, in which the ordering station is connected by at least one two-directional transport line to the loop.

67. The system as claimed in claim 65, further comprising an automated system at the surface for unloading the loading units or goods contained therein from the exchange stations and allow them to be picked up at the surface by the surface transport vehicles.

68. The system as claimed in claim 65, wherein at least one exchange station is configured to store loading units within the corresponding shaft.

69. The system as claimed in claim 65, wherein a largest interior dimension of the micro tunnel, in cross section, is between 1.5 m and 4 m.

70. The system as claimed in claim 65, further comprising shuttles for transporting the loading units, circulating in the micro tunnel.

71. The system as claimed in claim 70, further comprising at least one cable within the micro tunnel for hauling the shuttles.

72. The system as claimed in claim 70, further comprising a system for regulating the transport of the shuttles or loading units without overall flow management intelligence, each loading unit and/or its transport shuttle being fitted with at least one sensor that allows a loading unit and/or shuttle located in front thereof and the exchange stations to be located, the regulating system allowing the shuttles to regulate their speed according to the weight of traffic and/or to stop at the exchange stations.

* * * * *